United States Patent
Askew

(10) Patent No.: US 10,254,631 B2
(45) Date of Patent: Apr. 9, 2019

(54) IMAGING PLATFORM, IN PARTICULAR FOR IMAGING PEOPLE

(71) Applicant: Phillip Askew, New York, NY (US)

(72) Inventor: Phillip Askew, New York, NY (US)

( * ) Notice: Subject to any disclaimer, the term of this patent is extended or adjusted under 35 U.S.C. 154(b) by 0 days.

(21) Appl. No.: 15/829,627

(22) Filed: Dec. 1, 2017

(65) Prior Publication Data
US 2018/0157154 A1    Jun. 7, 2018

Related U.S. Application Data

(60) Provisional application No. 62/428,914, filed on Dec. 1, 2016.

(51) Int. Cl.
| G03B 17/58 | (2006.01) |
| G03B 17/56 | (2006.01) |
| F16M 13/02 | (2006.01) |
| F16M 11/20 | (2006.01) |
| F16M 11/22 | (2006.01) |
| F16M 11/24 | (2006.01) |
| F16M 11/12 | (2006.01) |
| F16M 11/10 | (2006.01) |
| F16M 11/18 | (2006.01) |

(52) U.S. Cl.
CPC ....... *G03B 17/561* (2013.01); *F16M 11/2085* (2013.01); *F16M 11/22* (2013.01); *F16M 11/24* (2013.01); *F16M 13/022* (2013.01); *F16M 11/10* (2013.01); *F16M 11/12* (2013.01); *F16M 11/18* (2013.01); *F16M 2200/04* (2013.01); *F16M 2200/08* (2013.01)

(58) Field of Classification Search
CPC ..................................... G03B 17/56
USPC ......................................................... 396/428
See application file for complete search history.

(56) References Cited

U.S. PATENT DOCUMENTS

| 501,340 | A |   | 7/1893 | Hackh |   |
| 2,599,269 | A | * | 6/1952 | Markle | F16M 11/10 248/404 |
| 5,778,258 | A | * | 7/1998 | Zamoyski | G03B 15/06 396/2 |
| 5,857,119 | A | * | 1/1999 | Borden | G03B 15/00 396/428 |
| 6,343,184 | B1 | * | 1/2002 | Huebner | G03B 15/06 348/E5.037 |
| 7,012,637 | B1 | * | 3/2006 | Blume | H04N 5/2254 348/14.09 |

(Continued)

*Primary Examiner* — Clayton E Laballe
*Assistant Examiner* — Kevin Butler
(74) *Attorney, Agent, or Firm* — Holtz, Holtz & Volek PC

(57) ABSTRACT

Imaging platform assembly includes a platform having a transparent portion, and a support frame that supports the platform at an elevated level, a rotatable camera support coupled to the support frame adjacent to the platform, a camera arm extending from the camera support, and a camera arranged at a free end of the camera arm and having a field of view oriented toward the platform. The camera support is rotatable to cause the camera to move in a path between a position above the platform and a position below the transparent region of the platform and enables imaging of a subject on the platform from above and below the platform. When the camera is fixed to the camera arm and the camera arm is fixed to the camera support, a complete rotation of the camera support causes a complete rotation of the camera around the platform.

20 Claims, 10 Drawing Sheets

(56) References Cited

U.S. PATENT DOCUMENTS

| | | | |
|---|---|---|---|
| 7,394,977 B2* | 7/2008 | Park | G06T 1/0007 |
| | | | 345/419 |
| 8,909,035 B2* | 12/2014 | Jancourtz | F16M 11/08 |
| | | | 248/123.2 |
| 9,618,830 B1* | 4/2017 | Nicholas | G03B 17/561 |
| 9,641,730 B2* | 5/2017 | Rosenberry | H04N 5/2251 |
| 9,807,373 B1* | 10/2017 | Bruce | H04N 13/0275 |
| 9,810,972 B2* | 11/2017 | Callomon | G03B 17/561 |
| 2011/0069880 A1* | 3/2011 | Sergieiev | F16M 11/10 |
| | | | 382/154 |
| 2013/0222684 A1* | 8/2013 | Mueller | F16M 11/18 |
| | | | 348/373 |
| 2015/0085067 A1* | 3/2015 | Mueller | A61B 5/6889 |
| | | | 348/37 |
| 2015/0282714 A1* | 10/2015 | Mueller | A61B 90/30 |
| | | | 348/37 |
| 2016/0102801 A1* | 4/2016 | Chu | F16M 11/08 |
| | | | 248/125.7 |
| 2016/0219192 A1* | 7/2016 | Rosenberry | H04N 5/2251 |
| 2016/0284116 A1* | 9/2016 | Crain | H04N 5/2252 |
| 2017/0363248 A1* | 12/2017 | Martini | F16M 11/10 |

* cited by examiner

IMAGING PLATFORM, IN PARTICULAR FOR IMAGING PEOPLE

FIELD OF THE INVENTION

The present invention relates generally to an imaging platform assembly that supports a subject being imaged and more specifically to an imaging platform adapted to support a subject and capturing images of the subject from a variety of angles. Even more specifically, the present invention relates to an imaging platform that can support a subject and capture images from above, below, and around the subject.

BACKGROUND OF THE INVENTION

It is common for practitioners of Yoga and other movement forms to film, image or video their movement routines. As is well known, a basic conventional filming technique available to the average consumer involves mounting a camera to a tripod or holding the camera by hand. The angles at which a subject can be captured are naturally limited using such conventional filming techniques. In particular, it is difficult to capture video of a subject from above, and it is near impossible to suitably capture video of a subject from below. In addition, it is difficult to smoothly film the subject while encircling the subject to capture the subject from fields of view spanning the full 360 degree range around the subject.

Especially in movement practices such as Yoga in which a practitioner may move through a series of complicated "asanas" (a Yoga "pose"), it would be of great aid for the yoga practitioner to view the subject from a wide variety of angles, and not only from angles available through conventional filming techniques.

OBJECTS AND SUMMARY OF THE INVENTION

It is an object of at least one embodiment of the present invention to address and provide a solution for the problems of filming, imaging or videotaping subjects mentioned above.

It is another object of at least one embodiment of the present invention to enable a subject to be filmed, imaged or videotaped while encircling the subject to capture the subject from fields of view spanning the full 360 degree range around the subject.

It is another object of at least one embodiment of the present invention to enable filming, imaging or videotaping of a subject and movement routines by a practitioner from a variety of angles including from above and below the practitioner.

It is yet another object of at least one embodiment of the present invention to enable filming, imaging or videotaping of a subject and movement routines by a practitioner from angles not available through conventional filming, imaging and videotaping techniques.

It is still another object of at least one embodiment of the present invention to provide an imaging platform providing an orbital filming device.

In order to achieve at least one of these objects and others, an imaging platform assembly in accordance with the invention includes a platform having a transparent portion, and a support frame having a lower edge region and an upper edge region vertically spaced from the lower edge region. The support frame supports the platform proximate the upper edge region such that a space is provided between the platform and the lower edge region of the support frame. The assembly also includes a rotatable camera support coupled to the support frame adjacent to the platform, a first camera arm which extends from the camera support and has a free end, and a camera arranged at the free end of the first camera arm and having a field of view oriented toward the platform.

The camera support is rotatable to cause the free end of the camera support to move around the platform such that the camera at the free end of the camera support moves in a path between a position above the platform and a position below the transparent region of the platform and enables imaging of a subject on the platform from above and below the platform. When the camera is fixed to the first camera arm and the first camera arm is fixed to the camera support, a complete rotation of the camera support causes a complete rotation of the camera around the platform, i.e., a circular path for the camera.

The platform may be planar and situated in a horizontal plane and the camera support may be a wheel mounted on the support frame for rotation in a plane perpendicular to the platform, i.e., a vertical plane.

To balance the camera support during its rotation, a counterweight arm may be provided and extends from the camera support in a direction opposite to a direction in which the first camera arms extends from the camera support. A counterweight may be arranged on the counterweight arm.

In one embodiment, the support frame includes a base at the lower edge region, a platform support ring at the upper edge region, and at least one support member that supports the platform support ring on the base. Each support member is positioned and configured to allow the first camera arm to pass under the platform without impacting it. A ladder may be integrated into a support member to enable access to the platform.

The support frame can include a first support pillar extending upward from the base to a height above the platform, the camera support being rotatably mounted to the first support pillar, and a separator mounted to the first support pillar in a position between the camera support and the first support pillar to maintain spacing between the camera support and the first support pillar. The separator may be a caster wheel which rotates against the camera support as the camera support rotates.

The support frame can include a second support pillar mounted to and extending upward from the platform support ring opposite the first pillar. The camera support is positioned between the first and second support pillars. To allow for relative rotation between the first and second pillars and the camera support, the camera support includes a case bearing center. A retaining structure retains the camera support on the first and second pillars and includes a bolt passing through the case bearing center and bolt receiver plates attached to the first and second support pillars.

The bolt receiver plates include at least one aligning set of bolt holes to enable placement of the bolt through any of set of aligning bolt holes to thereby secure the case bearing center to and between the first and second pillars. By providing multiple aligning sets of bolt holes arranged at different heights in a vertical direction, placement of the bolt through any of the aligning sets of bolt holes enables a height of the camera support to be variable relative to the platform dependent which set of aligning bolt holes the bolt is placed through. The caster wheel may also similarly be provided with an adjustment mechanism to address changes in the height of the camera support.

BRIEF DESCRIPTION OF THE DRAWINGS

The present invention will be more fully understood from the following detailed description of embodiments thereof, taken together with the drawings, in which.

DETAILED DESCRIPTION OF THE INVENTION

Figure 1:
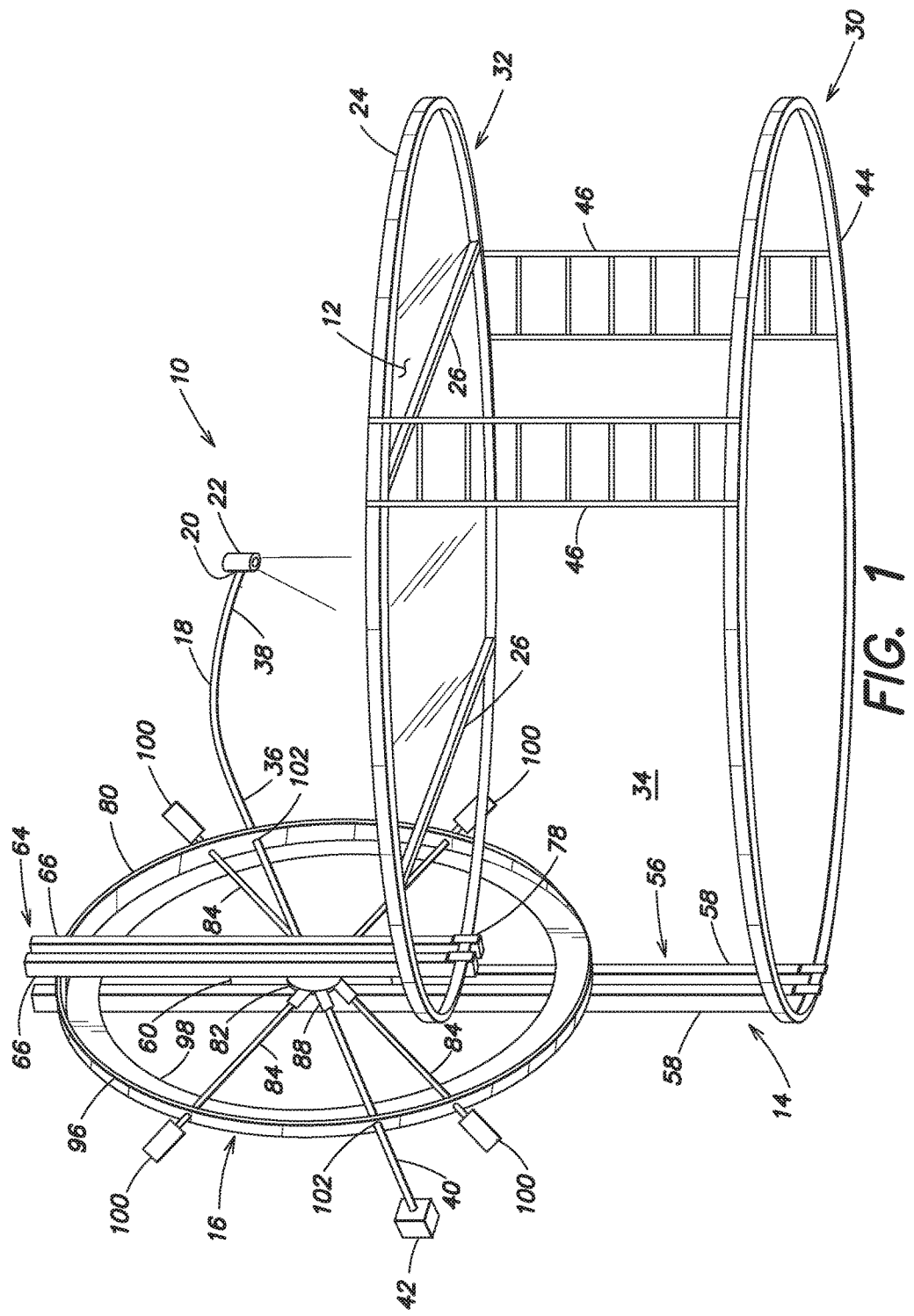
FIG. 1 is a perspective view of an imaging platform assembly in accordance with the invention.

Referring to the accompanying drawings wherein like reference numbers refer to the same or similar elements, an imaging platform assembly 10 according to a first embodiment of the present invention comprises an elevated platform 12, a support frame 14 for supporting the platform 12 at a height above the level on which the support frame 14 rests, a rotatable camera support 16 (camera wheel) coupled to the support frame 14 adjacent to the platform 12, a camera arm 18 (boom) which extends from the camera support 16 and has a free end 20, and a camera 22 arranged at the free end 20 of the camera arm 18.

Platform 12 may be made entirely of a transparent material. It is possible to make the platform 12 only partly of transparent material, i.e., that part which will be between the likely positions of the subject when on the platform 12 and the camera 22 when it passes below the platform 12 (described below). The material of the platform 12 should also be strong enough to support the expected subject to be imaged by the imaging platform. For example, the platform 12 may be formed of PLEXIGLAS™ or thick glass.

To support the platform 12, the support frame 14 includes an outer support ring 24 that retains the platform 12 and one or more optional cross supports 26 (two of which are shown) on which the platform 12 rests. Cross supports 26 may also be referred to as lateral extension members and extend from one location on the support ring 24 laterally to another location on the support ring 24. The number of cross supports 26 depends on, for example, the weight of the platform 12 and the construction and position of the cross supports 26. The elongate construction of the cross supports is not limiting, and they should be made of a rigid material. The particular shape and arrangement of the cross supports 26 is not important to the invention; however, the cross supports 26 should be positioned to avoid interfering with the imaging by the camera 22, i.e., the field of view of the camera 22 when the camera 22 is below the platform 12. That is, the cross supports 26 should not be between the camera 22 when it passes below the platform 12 and the expected positions of the subject when on the platform 12. As such, the cross supports 26 should not be in the center of the platform 12.

The support ring 24 as shown is circular but its shape is not important and other shapes of the support ring 24 may be provided. The platform 12 may rest on the cross supports 26 without being attached thereto or be secured to the support ring 24 and/or cross supports 26 in any manner known to those skilled in the art of, for example, securing glass to metal.

Support frame 14 has a lower edge region 30 and an upper edge region 32 vertically spaced from the lower edge region 30. The support frame 14 supports the platform 12 proximate the upper edge region 32 such that a space 34 is provided between the platform 12 and the lower edge region 30 of the support frame 14. The magnitude (height) of this space 34 must be sufficient to allow a portion of the camera arm 18 to pass below the platform 12 without impacting the level on which the support frame 14 rests, i.e., ground if the imaging platform assembly 10 is used in an outdoor environment or a floor if the imaging platform assembly 10 is used in an indoor environment.

Camera support 16 is situated in, and rotates in, a plane that is substantially perpendicular to the plane in which the platform 12 is situated. For most expected uses, the platform 12 is thus generally in a horizontal plane while the camera support 16 rotates in a substantially vertical plane. The camera support 16 is rotatably mounted to the support frame 14 by a rotation mechanism described below to cause the free end 20 of the camera arm 18 to move around the platform 12 such that the camera 22 at the free end 20 of the camera arm 18 moves in a path between a position above the platform 12 and a position below the platform 12. This path, usually circular in view of the circular nature of the camera support 16, enables imaging of a subject on the platform 12 from above and below the platform. When the camera 22 is above the platform 12, it has an unobstructed view of the subject on the platform 12 and when the camera 22 is below the platform 12, it images the subject on the platform through the transparent portion of the platform 12.

Camera arm 18 has the camera 22 at its free end 20, i.e., an end which is unrestrained and not connected to another structure. By providing the camera arm 18 with a free end 20, it becomes possible to simplify the rotation mechanism that causes rotation of the camera arm 18 via its connected end, i.e., that end connected to the camera support 16.

Camera arm 18 has a straight portion 36 that passes radially through the camera support 16 and a curved portion 38 that begins its curvature a sufficient distance to allow the camera 22 at the free end 20 to pass over the subject when on the platform 12. This distance depends on the height of the subject and dimensions of the camera support 16.

To improve the dynamics of the rotation of the camera arm 18 and provide stable rotation of the camera support 16, the weight of the camera arm 18 should be balanced. There are several different ways to achieve this balancing effect. For example, in the illustrated embodiment, for this purpose, a counterweight arm 40 extends from the camera support 16 in a direction opposite to an extending direction of the camera arm 18 and has a free end to which a counterweight 42 is attached to offset a weight of the camera arm 18 and camera 22. The counterweight arm 40 is shown to be shorter than the camera arm 18. Other means for balancing the weight of the camera 22 may also be used in the invention without deviating from the scope and spirit thereof.

Figure 2:
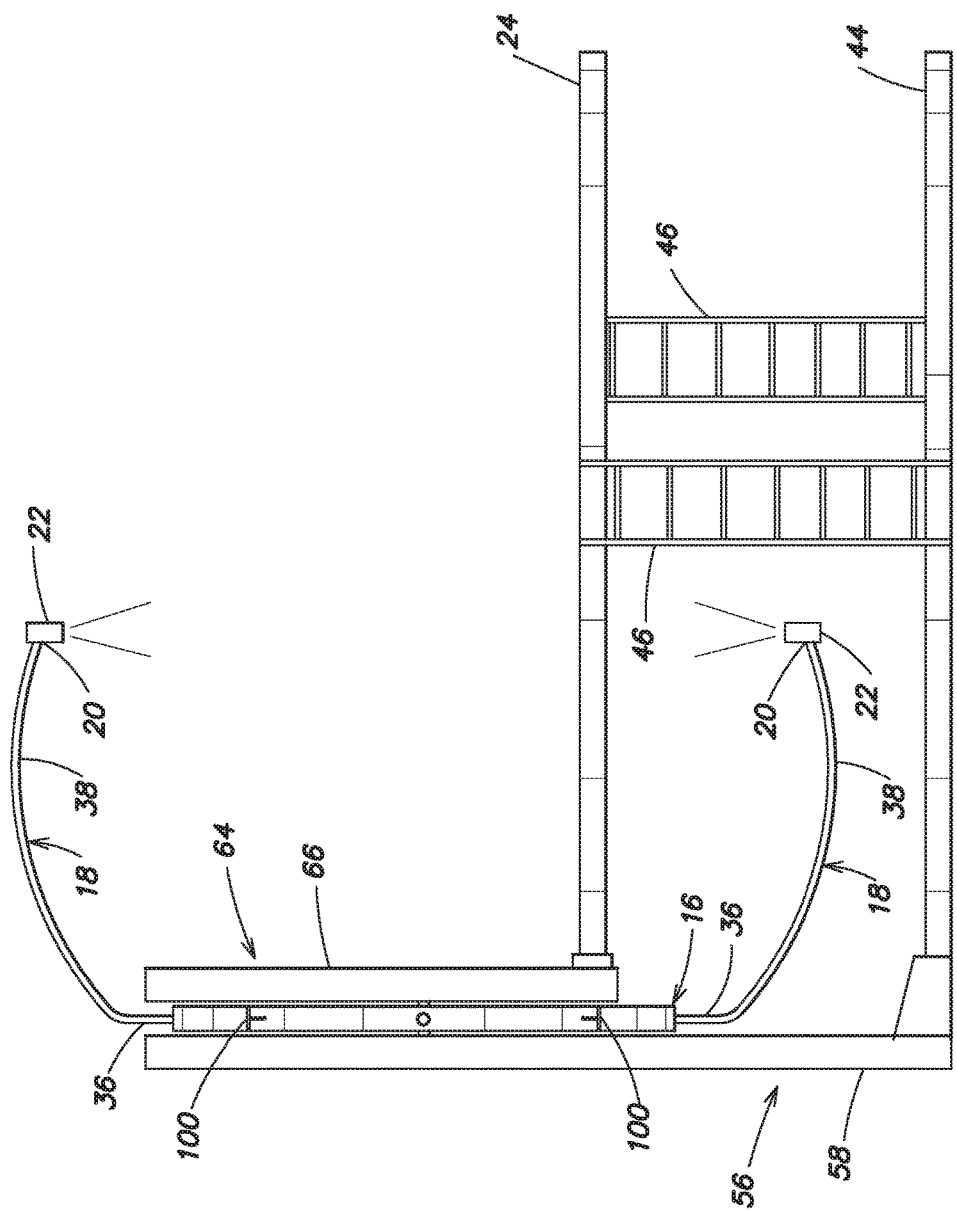
FIG. 2 is a side view of an imaging platform assembly in accordance with the invention.
Figure 6:
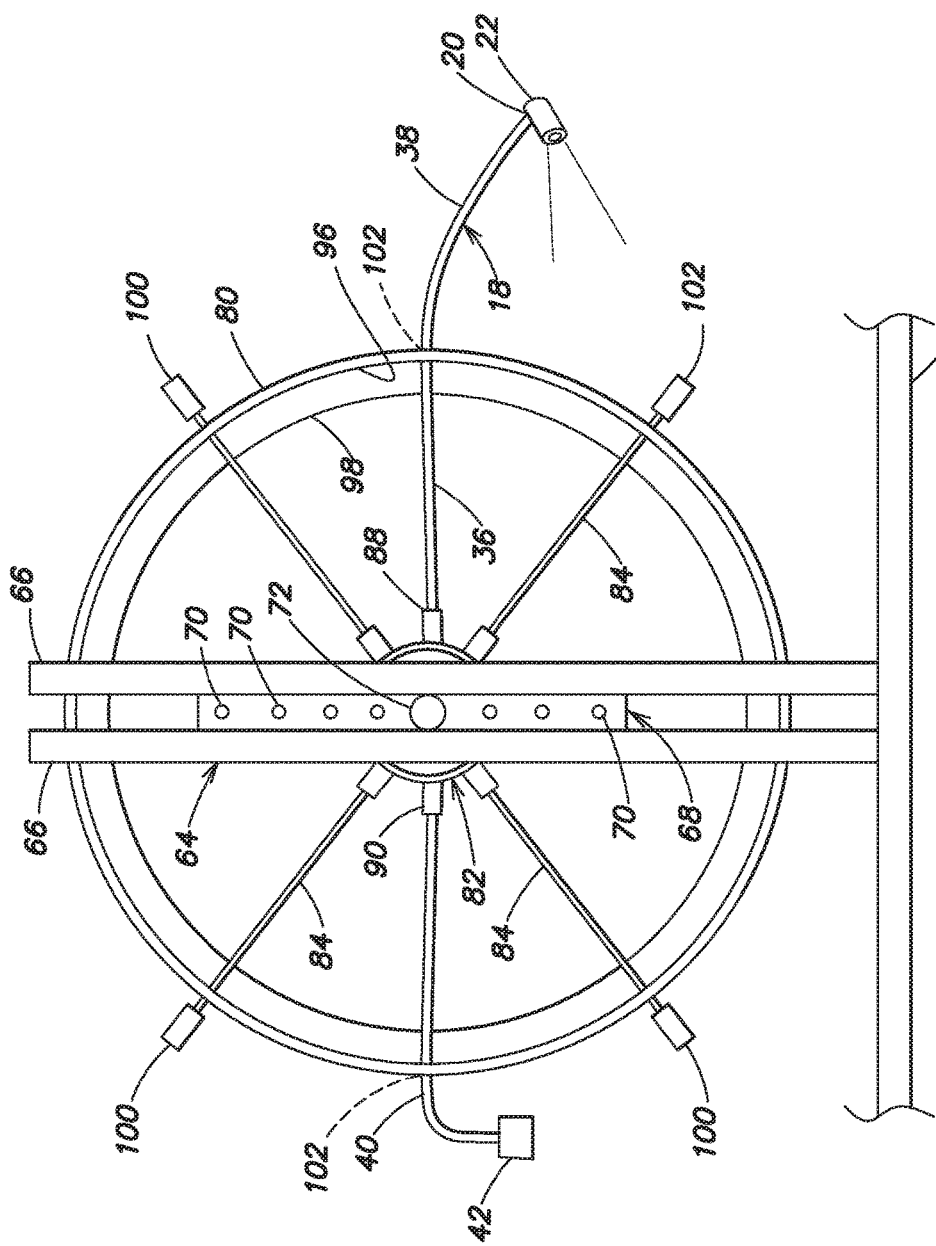
FIG. 6 is a front view of an upper portion of an imaging platform assembly in accordance with the invention.

Instead of a counterweight arm 40 and counterweight 42, a second camera arm 18 and camera 22 attached to its free end 20 may be provided as shown in FIGS. 2 and 6. This second camera arm 18 extends from the camera support 16 in a direction opposite to an extending direction of the first camera arm 18. Simultaneous imaging from both above and below the platform 12 is available in this embodiment, Support frame 14 can have various forms with its primary purpose being to elevate the platform 12 from the level on which the support frame 14 rests and provide support for the camera support 16. In addition to the outer circular ring 24 and cross supports 26, the support frame 14 in the illustrated embodiment includes a base 44 which is to be placed on the ground or other support level (e.g., floor), and support members 46 for supporting the support ring 24. For example, two or three support members 46 may be provided. The base 44 as shown is circular but its shape is not important and other shapes of the base 44 may be provided.

Support members 46 may be arranged at positions substantially equidistant from each other around the circumference of the base 44 and extend upward from the base 44. The support members 46 may be formed by at least one elongate leg made of rigid material(s). At least one of the support members 46 may be formed as a ladder comprising two legs and rungs. Preferably, two of the support members 46 are formed as ladders (see FIGS. 1 and 2). If the subject being imaged using the imaging platform assembly 10 is a person, the person can climb the ladder to reach the platform 12. Alternatively, a ladder to the platform 12 may be provided separately (see FIG. 5 wherein there is no ladder integrated into the support frame 14).

Figure 4:
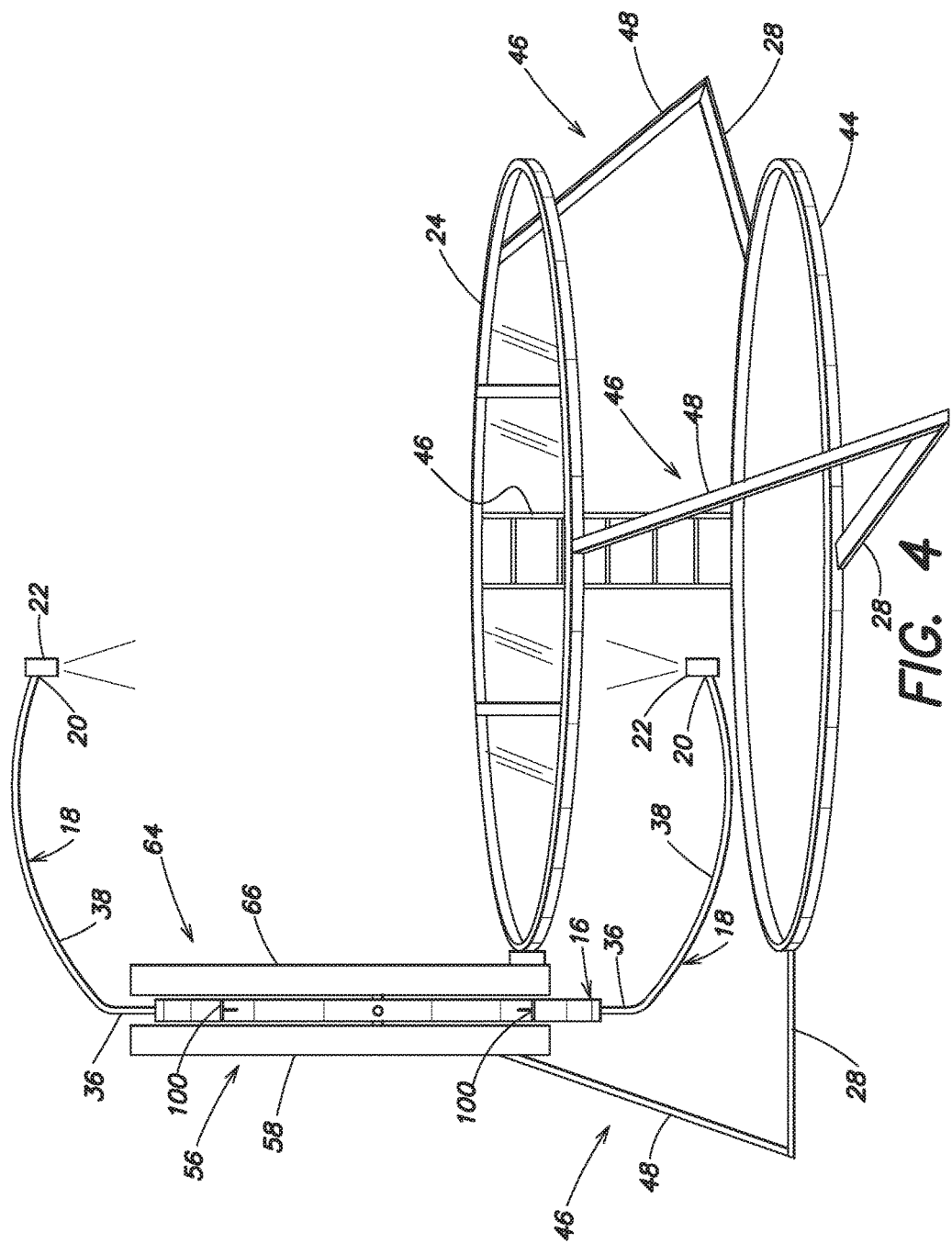
FIG. 4 is a perspective view of another embodiment of an imaging platform assembly in accordance with the invention.

As shown in FIG. 4, the support members 46 may alternatively be formed by a base leg 28 that extends radially outward from the base 44, and a diagonal leg 48 which extends diagonally upward from a radial outer end of the base leg 28 to reach the support ring 24, to thereby define two sides of a triangle.

Figure 5:
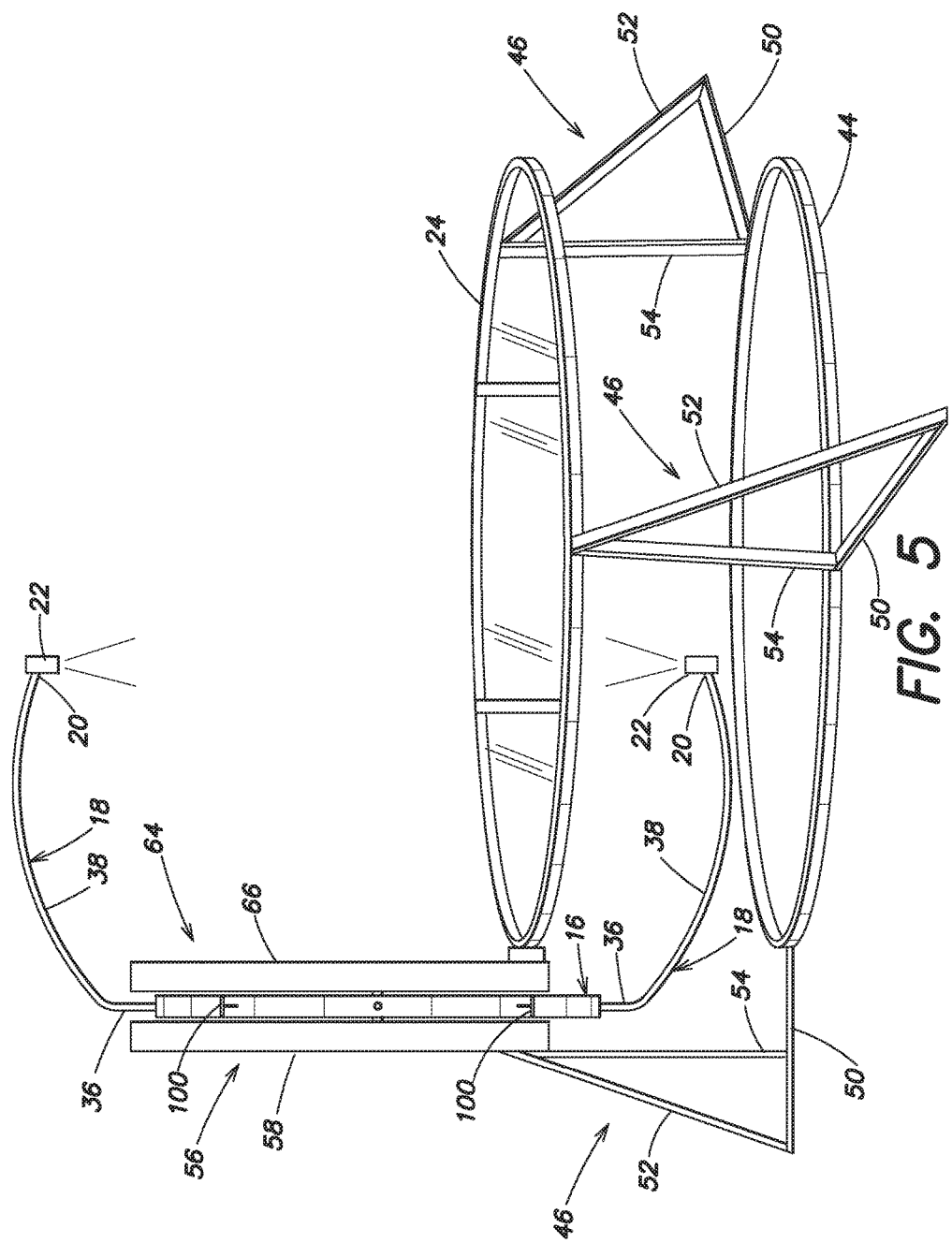
FIG. 5 is a perspective view of still another embodiment of an imaging platform assembly in accordance with the invention.

As shown in FIG. 5, it is also possible to form one or more of the support members 46 to have a base leg 50, a diagonal leg 52 which extends to the support ring 24 from the radial outer end of the base leg 50, and a vertical leg 54 which extends from a radial inner end of the base leg 50 to reach the support ring 24.

In general, the support members 46 may be formed as any suitable structure which can reliably support the support ring 24 elevated from and on the base 44. Instead of three (or more) support members 46, only two support members 46 may be provided, as long as the support members 46 are sufficiently spaced apart around the circumference of the base 44 and support ring 24 to reliably support the support ring 24, and avoid obstructing the path of the camera arm 18 in its swinging motion under the platform 12.

The components of the support frame 14 may be made of a rigid material, such as steel or another metal or metal alloy. The specific materials are not important in the invention, so long as the support frame 14 is able to stably support the platform 12 and the camera support 16, and its attachments during use.

In the illustrated embodiment, the support ring 24 has substantially the same size and shape as the base 44. It should be noted that while the support ring 24 and base 44 are substantially circular in this embodiment, the shape is not particularly limited. The support ring 24 and base 44 may be rectangular, for example. It is also possible that the support ring 24 and base 44 have different shapes.

The support ring 24 is attached to upper edge portions of the support members 46 and is thus supported by the support members 46. This attachment may be by any known attachment technique, e.g., welding, clamps, and screws.

Cameras 22 may be still image cameras or video cameras or cameras capable of obtaining both still images and videos. If multiple cameras 22 are provided, each may be a still image camera or a video camera, or one capable of performing both types of imaging. Cameras 22 may be remote controlled cameras.

Figure 3:
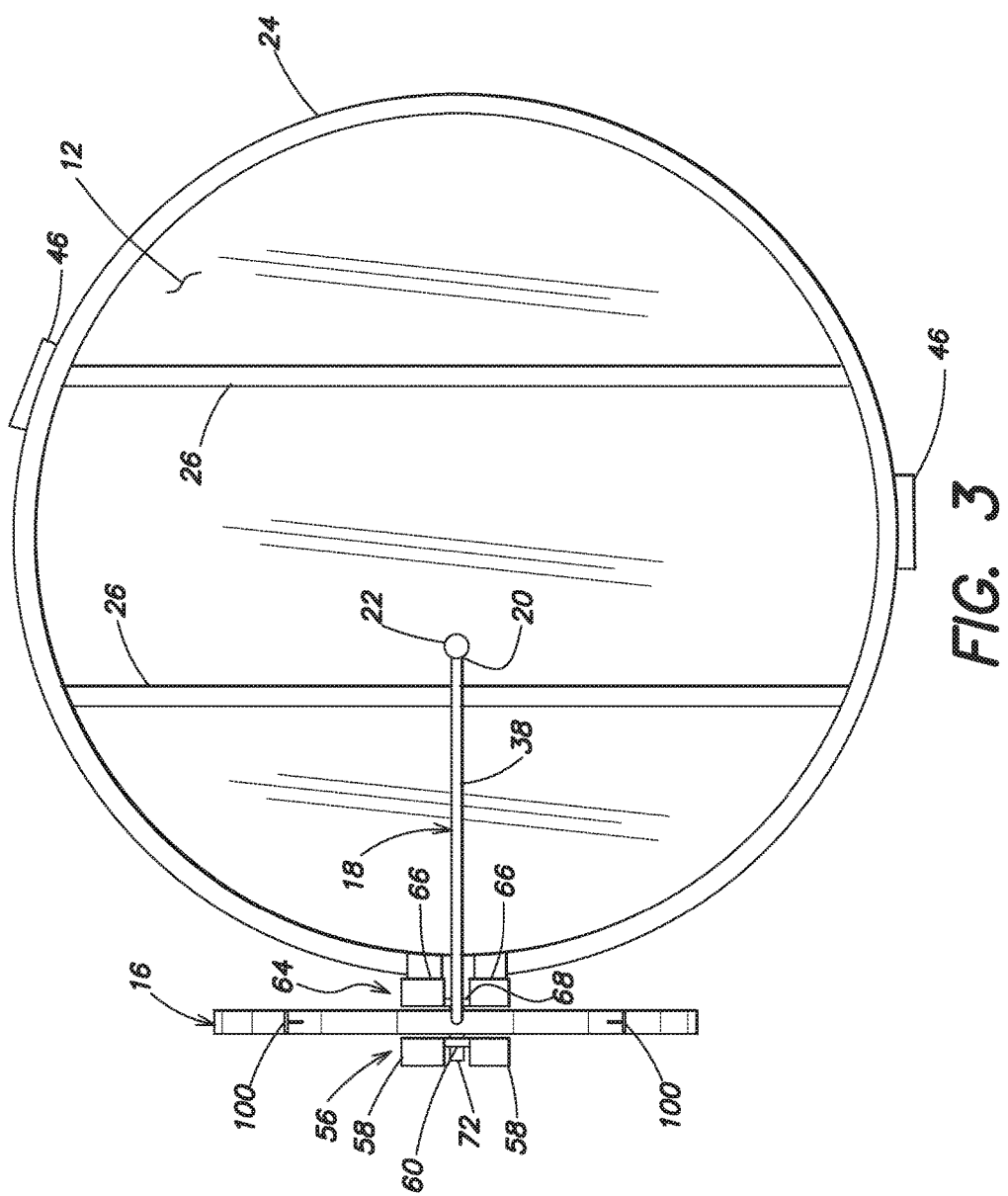
FIG. 3 is a top view of an imaging platform assembly in accordance with the invention.

Referring back to FIGS. 1-3, support frame 14 also includes a first, outer support pillar 56 which supports the camera support 16. The first support pillar 56 is attached to the base 44 (for example, by welding or bolts or another suitable attachment mechanism or attachment means) and extends above the support ring 24. In the illustrated embodiment, the first support pillar 56 includes two parallel beams 58 made of a rigid material, such as steel, which are joined together via a bolt receiver plate 60 attached to the beams 58, e.g., by welding (see FIG. 7). The bolt receiver plate 60 has large bolt holes 62 which are provided on an outer side of the beams 58 facing away from the platform 12 (see FIG. 3). For example, four bolt holes 62 may be arranged in the vertical direction in the bolt receiver plate 60.

A second, inner support pillar 64 for supporting the camera support 16 is attached to the support ring 24 (for example, by welding or bolts or another suitable attachment mechanism or attachment means) at a position adjacent to the first support pillar 56 and extends vertically from the support ring 24 to a height substantially matching the first support pillar 56 (see FIG. 1). Like the first support pillar 56, the second support pillar 64 includes two parallel beams 66 made of a rigid material, such as steel, which are joined together via a bolt receiver plate 68 attached to the beams 66, e.g., by welding (see FIG. 7). The bolt receiver plate 68 has large bolt holes 70 which are provided on an outer side of the beams 66 facing away from the platform 12. For example, four bolt holes 70 may be arranged in the vertical direction in the bolt receiver plate 68.

Figure 8:
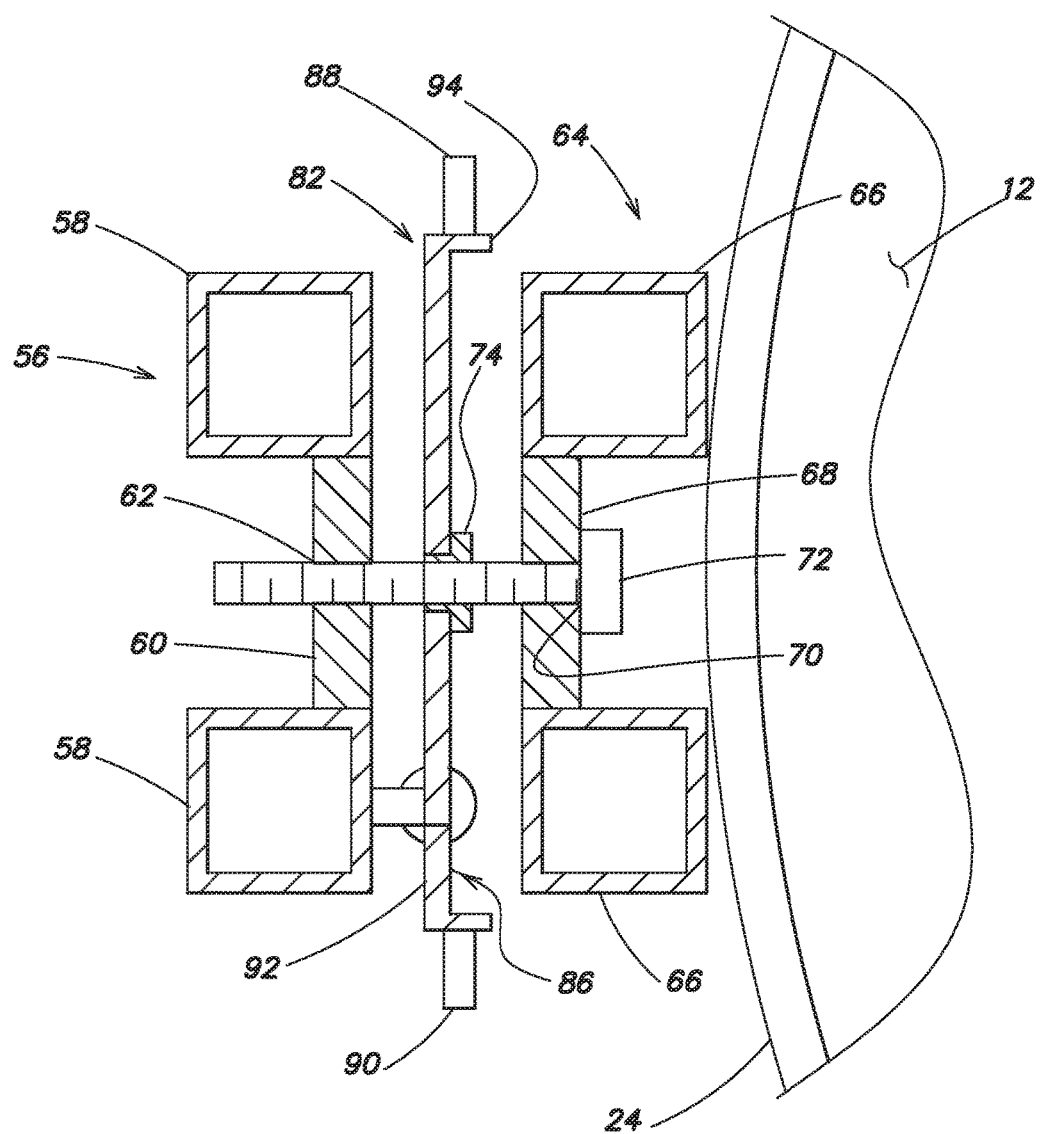
FIG. 8 is a cross-sectional view through the support frame with the camera support present.

The first and second support pillars 56 and 64 are on opposite sides of the camera support 16 (see FIG. 8). The camera support 16 is attached to the first and second support pillars 56, 64 via a large bolt 72 which passes through a case bearing center 74 of the camera support 16 and a set of corresponding bolt holes 62, 70 in the bolt receiver plates 60, 68 of the first and second support pillars 56, 64. The height of the camera support 16 with respect to the platform 12 can thus be adjusted by attaching the camera support 16 at the case bearing center 74 to different sets of corresponding bolt holes 62, 70 in the bolt receiver plates 60, 68. The bolt holes 60, 68 are situated such that when the camera support 16 is attached to the support pillars 56, 64 via engagement of the bolt 72 with any aligning set of bolt holes 60, 68, at least a part of the camera support 16 is positioned below the support ring 24.

Case bearing center 74 is an assembly that has a housing with mean for attaching it to the camera support 16 and one or more bearings that interact with the bolt 72 to allow the housing to rotate relative to the bolt 72 (see FIG. 8). The bolt 72 is fixed to the beams 56, 64 thereby allowing the case bearing center 74 to rotate along with the structure attached thereto.

The combination of the case bearing center 74, bolt 72 and bolts holes 62, 70 in the bolt receiver plates 60, 68 of the first and second pillars 56, 64 constitute a mechanism to enable the camera support 16 to rotate and have an adjustable height relative to the platform 12. Different mechanisms or means to enable a variable height of the camera support 16 relative to the platform 12 may also be provided in the invention, while also enabling rotation of the camera support 16.

Figure 7:
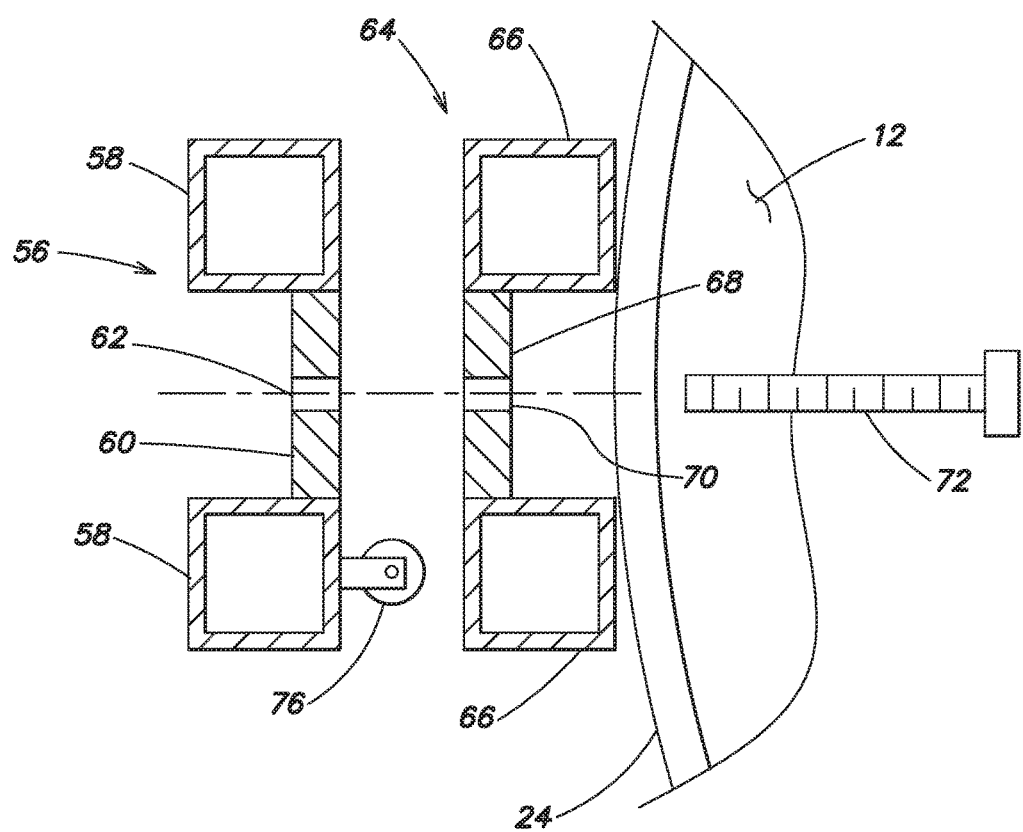
FIG. 7 is a cross-sectional view through the support frame with the camera support removed.

A caster wheel 76 is interposed between the support pillar 56 and the camera support 16 so as to ensure sufficient spacing between the support pillar 56 and camera support 16 so that the camera support 16 can easily rotate via the case bearing center 74 (see FIG. 7). Since the camera support 16 is mounted to the second support pillar 64 which is in turn attached at a lower edge region 78 thereof to the support ring 24, the weight of the second pillar 64 and support frame 14 acts on the camera support 16, causing the angle of the camera support 16 (and thus of the camera arm 18 and camera 22) to distort. The caster wheel 76 is provided to prevent this distortion.

The caster wheel 76 is attached to an inner side of the first support pillar 56 (i.e., a side facing the camera support 16) at a position below the support ring 24 where a bottom portion of the camera support 16 passes by the support pillar 56. The caster wheel 76 is mounted or attached to the support pillar 56, for example, via bolts or welding. The caster wheel 76 is configured to operatively rotate against the camera support 16 as the camera support 16 rotates on its axis such that the camera support 16 can be moved smoothly without friction against the first support pillar 56 and at the desired angle.

Additional caster wheels can be provided elsewhere on the first and/or second support pillars 56, 64 to guide the rotational movement of the camera support 16. The position in which such caster wheels would be placed would be obvious to those skilled in the art to which this invention pertains in view of the disclosure herein. Instead of caster wheels, any type of separator that allows the camera support 16 to glide along it to stabilize its rotation may be used.

As shown in FIG. 5, the first support pillar 56 does not have to be connected to the base 44. Rather, the first support pillar 56 may be connected to one of the support members 46.

The camera support 16 is preferably made of one or more rigid materials, such as steel, and in the illustrated embodiment, includes an outer ring 80, a central support bracket 82, spokes 84 extending between the central support bracket 82 and the outer ring 80 and the case bearing center 74.

Figure 9:
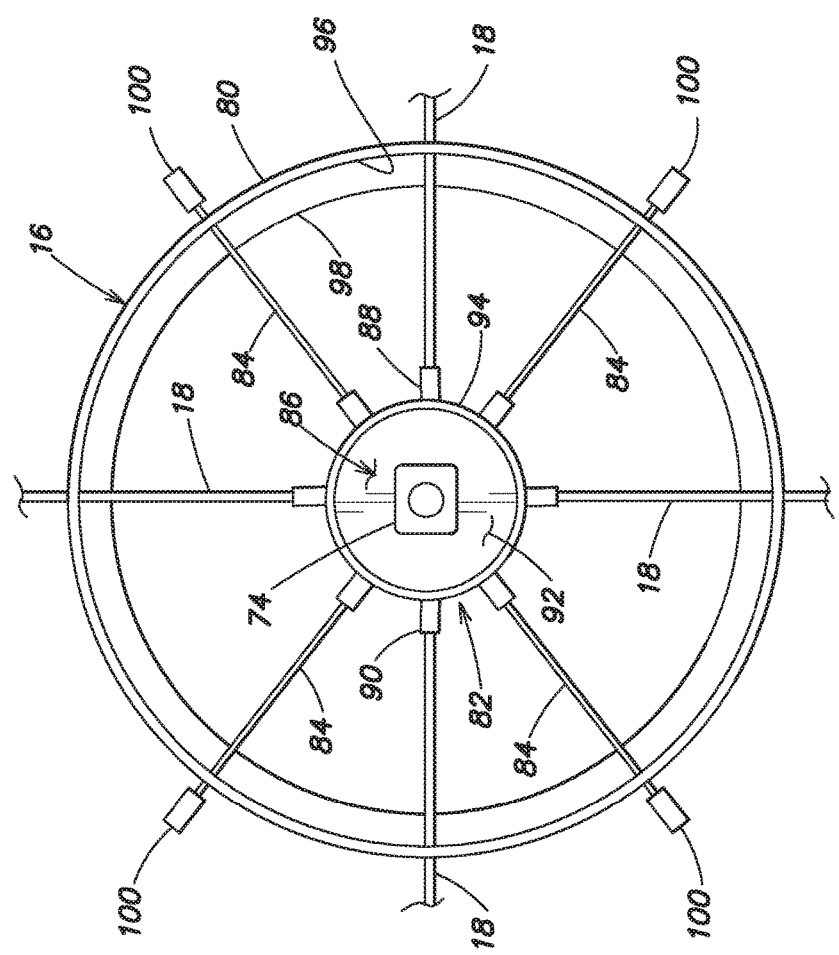
FIG. 9 is a front view of the camera support.

The central support bracket 82 includes a circular portion 86 and arm receiving portions 88, 90 on opposite sides (see FIG. 9). Although only two arm receiving portions 88, 90 are shown, e.g., in FIG. 6, it is possible to provide additional arm receiving portions, e.g., four spaced equidistant around the circular portion 86. Four arm receiving portions will allow for a total of four camera arms (see FIG. 9).

The circular portion 86 is formed by a circular center plate 92 in the radial plane and an outer rim 94 which extends perpendicularly from an outer end of the circular plate 92 in the axial direction. The case bearing center 74 of the camera support 16 is attached, e.g., by being bolted or welded, to the center plate 92 of the circular portion 86 and may extend into a cavity defined by the center plate 92 and the outer rim 94.

The arm receiving portions 88, 90 can be formed by respective pairs of receiver plates which are welded to the circular portion 86 and arranged at opposite positions along the circumference of the circular portion 86 of the support bracket 82. Alternatively, the arm receiving portions 88, 90 may each be formed by four receiver plates which form a hollow rectangular encasement for receiving the retained end of camera arm 18 and the retained end of counterweight arm 40, or by three receiver plates forming a three-sided encasement. As mentioned above, it is also possible to provide additional arm receiving portions and additional camera/counterweight arms each constructed in the same or a different manner. Regardless of the number of arm receiving portions provided, the arm receiving portions should be positioned equidistant from each other along the circumference of the circular portion 86.

The spokes 84 form a generally "X" shape. The spokes 84 are attached, e.g., by welding, at first longitudinal ends thereof to the circular portion 86 of the support bracket 82 at positions along the circumference of the circular portion 86 in between the arm receiving portions 88, 90. For example, the spokes 84 are welded at positions so as to form an approximately 45 degree angle with an adjacent one of the arm receiving portions 88, 90. While four spokes 84 are present in the illustrated embodiment, the number of spokes 84 is not particularly limited. The spokes 84 are attached, e.g., by welding, to the outer ring 80 of the camera support 16 at second longitudinal ends thereof.

The outer ring 80 may be formed of an outer lip 96 which extends laterally outward in a direction perpendicular to a radial direction of the camera support 16, and an inner rim 98 which extends radially inward from an end of the outer lip 96. The spokes 84 are preferably attached, e.g., by welding, to the outer lip 96 and/or inner rim 98.

Handles 100 are provided along an outer surface of the outer lip 96, preferably at positions corresponding to the positions of the spokes 84 provided at an inner side of the outer lip 96. The handles 100 can be formed as metal protrusions which extend radially outward from the outer ring 80 and are attached to the outer lip 96 by, for example, welding.

At least two arm holes 102 are provided in the outer lip 96 at opposite positions across the diameter of the camera support 16. Arm holes 102 should be provided in correspondence with the number and location of the arm receiving portions 88, 90. The camera arm 18 is inserted through one of the arm holes 102 and fitted into the corresponding arm receiving portion 88 or 90. The camera arm 18 is secured in the arm receiving portion 88 or 90 by, for example, bolts. Similarly, the counterweight arm 40 is inserted through the other one of the arm holes 102 and fitted into the other of the arm receiving portions 88 or 90 and secured therein by, for example, bolts.

In another embodiment, additional arm receiving portions and additional camera arms and/or counterweight arms fitted thereto may be provided, facilitating image capture of a subject simultaneously from a plurality of angles. For example, as shown in FIG. 2, there are two camera arms 18 on opposite sides of the camera support 16, and no counterweight arms are needed since the camera arms 18 balance themselves.

Generally, the plurality of camera arms, cameras, and/or counterweight arms and counterweights should be provided and configured such that weight is distributed evenly across the camera support 16 to allow for smooth and stable rotation of the camera support 16. For example, each camera arm 18 should be balanced on an opposite side of the camera support 16 by another camera arm 18 (and camera 22) or by a counterweight arm 40 with a counterweight 42, or other appropriate weight compensation system/unit.

In operation, an operator can grasp the camera support 16 by one or more of the handles 100 and cause the camera support 16 to rotate about the bolt 72 by gliding of the case bearing center 74 around the bolt 72. The cameras 22 are remotely controlled or through timing to take film, images or videos of the subject on the platform 12.

Figure 10:
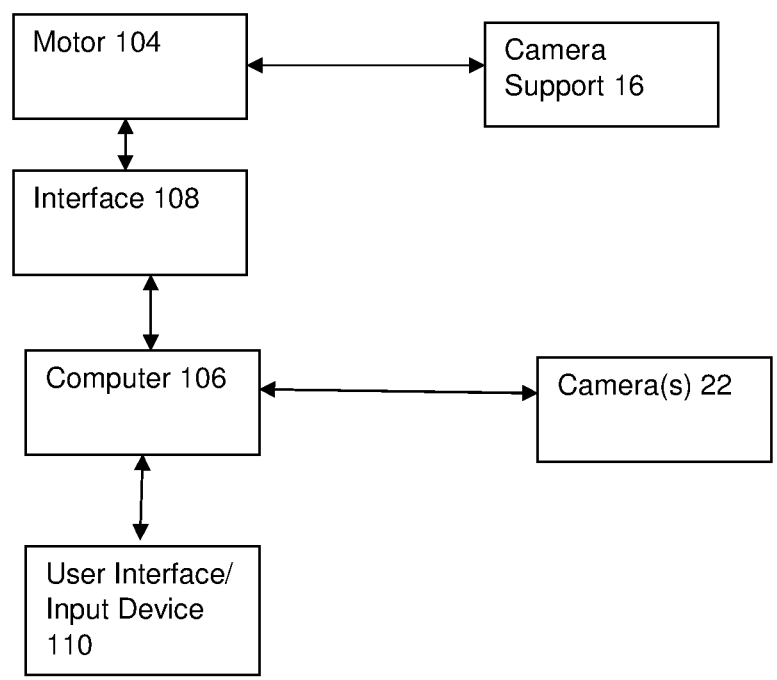
FIG. 10 is a schematic of a motorized operation of the imaging platform assembly.

Alternatively, with reference to FIG. 10, a motor 104 can be provided to drive an axle attached or coupled to the case bearing center 74 in order to rotate the camera support 16, or otherwise interact with the camera support 16 to drive its rotation. If a motor 104 is provided, the handles 100 may be omitted.

It will be further appreciated that the motor 104 can be controlled by a computer 106 which is provided with interface means 108 for sending control signals to the motor 104. In this case, the motor 104 should be provided with a processor for interpreting control signals and controlling overall operation of the motor 104. A signal cable may be used, or wireless communication (for example, Bluetooth™) is also possible. In this case, the computer 106 should be provided with an appropriate transceiver and antenna, and the motor 104 should also be provided with a transceiver and an antenna that is configured to receive wireless signals.

The computer 106 may also control the camera 22 in conjunction or coordination with control of the motor 104, for example, by wireless communication using Bluetooth™. The computer 106 includes at least a CPU, a ROM having a program stored therein, and a RAM to serve as a working memory. The CPU executes a program stored in the ROM to control the motor 104. The computer 106 can be provided with one or more user interfaces or input device 110 (keyboard, mouse, touchscreen and display, etc.) by which a user can control the computer, as well as the motor and/or camera 22.

A sensor may be provided at the camera support 16 or in the motor 104 to detect the rotation angle of the camera support 16 and synchronize image capture so as to capture images at precise desired angles. There is thus detected rotation angle feedback to the computer 106. For example, an incremental encoder may be used to detect the rotation angle, and may send an encoder pulse signal to the computer 106 by which the rotation angle of the camera support 16 may be detected. It is to be understood that control of the motor 104 and/or camera 22 can be implemented by hardware, circuit, software, firmware, middleware, microcode, or any combination thereof.

As can be understood from the above description, the platform 12, camera support 16, camera arms 16 and counterweight arm 40 are arranged with respect to one another such that the camera 22 which is mounted to the free end 20 of the camera arm 18 makes one full rotation around the platform 12 as the camera support 16 passes through a complete rotation. That is, as the camera support 16 rotates, the camera 22 fully encircles the platform 12 in a circular path or loop, passing from locations above the platform 12 to locations below and around the platform 12.

The imaging platform assembly 10 allows an operator (for example, a director or cinematographer) to capture unique still image or motion picture shots of actions of a subject on the platform 12 from angles spanning a full 360 degree range around the subject. While any number of uses is possible, the present invention is particularly suited for capturing subjects (people) practicing yoga, meditation, martial arts, dance, and other movement forms from a variety of angles.

In one particularly useful embodiment, a deck is arranged to surround the imaging platform assembly 10 at a height substantially corresponding with a height of the support ring 24 and platform 12. The deck is provided with a track. A movable platform having wheels engages with the track. A tripod-mounted camera is secured to the movable platform. The movable platform is movable around the platform 12 via the track so that an operator can capture images of the subject from angles different than those captured by the camera 22 mounted to the camera arm 18. In addition, the deck may be made wider at a position near the camera support 16 so that an operator can stand thereon and manually rotate the camera support 16 at the wide portion of the deck between the camera support 16 and the track.

In another modification, mounting brackets are provided for mounting the imaging platform assembly 10 to a trailer, to thereby facilitate easy transport.

The dimensions of the various components of the imaging platform assembly 10 are not particularly limited. To facilitate easy understanding, some examples of dimensions of the components are provided when the imaging platform assembly 10 is used for filming, imaging or videotaping a Yoga practitioner during a movement. Needless to say, these dimensions are for exemplifying purposes only, and should not be construed to limit the present invention in any way. The circular base 44 and support ring 24 may be approximately 8 feet in diameter and formed from 2"×2" steel. The support ring 24 is supported approximately 9.5' above the base 44. The first support pillar 56 is approximately 13.5 feet, and the steel beams 58 are 2"×2". The second support pillar 64 is formed of 2"×2" steel beams 66 which are approximately 4 feet in length, such that the second support pillar 64 matches the first support pillar 56 in height. The camera support 16 is approximately 5 feet in diameter, and has a width of about 2 inches. The camera arm 18 is approximately 10 feet in length, and the counterweight arm 40 is approximately 3 feet in length.

The optional deck surrounding the imaging platform assembly 10 may be approximately 6 feet tall, and the track width approximately 2 feet, and having a diameter of about 20 feet. The deck may be formed in a variety of shapes. For example, the deck may be octagonal. The deck may be 3 feet wide where the camera arm 18 passes, and 4 feet wide where the camera arm 18 does not pass.

As will be appreciated by those skilled in the art to which the present invention pertains, the various metal components of the imaging platform assembly 10 of the present invention may be attached by any suitable means, including but not limited to welding, brackets, and bolts in conjunction with bolt receiver plates and/or nuts. In addition, while many of the metal components have been described separate elements, it is possible to provide some of the components as integral components which are formed as one piece by machining.

Various modifications, omissions, and substitutions may be made without departing from the scope and spirit of the invention as set forth in the appended claims.

The invention claimed is:

1. An imaging platform assembly, comprising:
   a platform having a transparent portion;
   a support frame having a lower edge region and an upper edge region vertically spaced from said lower edge region, said support frame supporting said platform proximate said upper edge region such that a space is provided between said platform and said lower edge region of said support frame;
   a rotatable camera support coupled to said support frame adjacent to said platform;
   a first camera arm which extends from said camera support and has a free end; and
   a camera arranged at said free end of said first camera arm and having a field of view oriented toward said platform,
   wherein said camera support is rotatable to cause said free end of said camera support to move around said platform such that said camera at said free end of said camera support moves in a path between a position above said platform and a position below said transparent region of said platform and enables imaging of a subject on said platform from above and below said platform, and wherein said platform is planar and said camera support is a wheel mounted on said support frame for rotation in a plane perpendicular to said platform.

2. The assembly of claim 1, further comprising:
a counterweight arm which extends from said camera support in a direction opposite to a direction in which said first camera arms extends from said camera support; and
a counterweight on said counterweight arm,
said counterweight arm and said counterweight being configured to balance weight of said first camera arm and said camera to provide for stable rotation of said camera support.

3. The assembly of claim 1, wherein said platform is situated in a horizontal plane, said camera support being situated in a vertical plane perpendicular to said horizontal plane in which said platform is situated.

4. The assembly of claim 1, wherein said camera is fixed to said first camera arm and said first camera arm is fixed to said camera support such that a complete rotation of said camera support causes a complete rotation of said camera around said platform.

5. The assembly of claim 1, wherein said support frame comprises a base at said lower edge region, a platform support ring at said upper edge region for supporting said platform, and at least one support member that supports said platform support ring on said base, said at least one support member being configured to allow said first camera arm to pass under said platform without impacting any of said at least one support member.

6. The assembly of claim 5, wherein said at least one support member comprises a ladder to enable access to said platform.

7. The assembly of claim 5, wherein said at least one support member comprises a plurality of support members.

8. The assembly of claim 1, wherein said support frame comprises:
a base at said lower edge region; and
a first support pillar extending upward from said base to a height above said platform, said camera support being rotatably mounted to said first support pillar.

9. The assembly of claim 1, wherein said support frame comprises:
a base at said lower edge region;
a platform support ring at said upper edge region for supporting said platform;
a first support member that supports said platform support ring on said base, said first support member being configured to allow said first camera arm to pass under said platform without impacting said first support member;
a first support pillar, said camera support being rotatably mounted to said first support pillar; and
a second support member that supports said first support pillar on said base, said second support member being configured to allow said first camera arm to pass under said platform without impacting said second support member.

10. The assembly of claim 9, further comprising a second support pillar mounted to and extending upward from said platform support ring opposite said first support pillar, said camera support being supported by and positioned between said first and second support pillars.

11. The assembly of claim 1, wherein said camera support is configured such that at least a part of said camera support is positioned below said platform.

12. The assembly of claim 1, wherein said support frame is configured to retain said camera support at a plurality of different vertical heights relative to said platform.

13. An imaging platform assembly, comprising:
a platform having a transparent portion;
a support frame having a lower edge region and an upper edge region vertically spaced from said lower edge region, said support frame supporting said platform proximate said upper edge region such that a space is provided between said platform and said lower edge region of said support frame;
a rotatable camera support coupled to said support frame adjacent to said platform;
a first camera arm which extends from said camera support and has a free end; and
a camera arranged at said free end of said first camera arm and having a field of view oriented toward said platform,
wherein said camera support is rotatable to cause said free end of said camera support to move around said platform such that said camera at said free end of said camera support moves in a path between a position above said platform and a position below said transparent region of said platform and enables imaging of a subject on said platform from above and below said platform,
wherein said support frame comprises:
a base at said lower edge region; and
a first support pillar extending upward from said base to a height above said platform, said camera support being rotatably mounted to said first support pillar, and
wherein the assembly further comprises:
a separator mounted to said first support pillar in a position between said camera support and said first support pillar to maintain spacing between said camera support and said first support pillar.

14. The assembly of claim 13, wherein said separator comprises a caster wheel which rotates against said camera support as said camera support rotates.

15. The assembly of claim 13, wherein said platform is planar and said camera support is a wheel mounted on said support frame for rotation in a plane perpendicular to said platform.

16. An imaging platform assembly, comprising:
a platform having a transparent portion;
a support frame having a lower edge region and an upper edge region vertically spaced from said lower edge region, said support frame supporting said platform proximate said upper edge region such that a space is provided between said platform and said lower edge region of said support frame;
a rotatable camera support coupled to said support frame adjacent to said platform;
a first camera arm which extends from said camera support and has a free end; and
a camera arranged at said free end of said first camera arm and having a field of view oriented toward said platform,
wherein said camera support is rotatable to cause said free end of said camera support to move around said platform such that said camera at said free end of said camera support moves in a path between a position above said platform and a position below said transparent region of said platform and enables imaging of a subject on said platform from above and below said platform,
wherein said support frame comprises:
  a base at said lower edge region;
  a first support pillar extending upward from said base to a height above said platform, said camera support being rotatably mounted to said first support pillar;
  a platform support ring at said upper edge region for supporting said platform;
  at least one support member that supports said platform support ring on said base, said at least one support member being configured to allow said first camera arm to pass under said platform without impacting any of said at least one support member; and
  a second support pillar mounted to and extending upward from said platform support ring opposite said first support pillar,
said camera support being supported by and positioned between said first and second support pillars.

17. The assembly of claim 16, wherein said camera support includes a case bearing center that rotates relative to said first and second support pillars.

18. The assembly of claim 17, further comprising a retaining structure to retain said camera support on said first and second support pillars while allowing rotation of said camera support relative to said first and second support pillars.

19. The assembly of claim 18, wherein said retaining structure comprises:
  a bolt passing through said case bearing center; and
  a bolt receiver plate attached to each of said first and second support pillars and that include at least one aligning set of bolt holes to enable placement of said bolt through any of said at least one aligning set of bolt holes to thereby secure said case bearing center to and between said first and second support pillars.

20. The assembly of claim 19, wherein said bolt receiver plates include a plurality of aligning sets of bolt holes arranged in a vertical direction to enable placement of said bolt through any of said aligning sets of bolt holes to enable a height of said camera support to vary relative to said platform dependent which set of aligning bolt holes said bolt is placed through.

* * * * *